US010366198B2

(12) United States Patent
Guillou et al.

(10) Patent No.: US 10,366,198 B2
(45) Date of Patent: Jul. 30, 2019

(54) SYSTEM AND METHOD FOR PRODUCT DATA MANAGEMENT AND 3D MODEL VISUALIZATION OF ELECTRICAL WIRING DESIGN AND SPECIFICATIONS

(71) Applicant: SAFRAN AIRCRAFT ENGINES, Paris (FR)

(72) Inventors: Pascal Raymond Guillou, Issy-les-Moulineaux (FR); Antoine Jean Jausovec, Tournan-en-Brie (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 153 days.

(21) Appl. No.: 15/287,108

(22) Filed: Oct. 6, 2016

(65) Prior Publication Data

US 2018/0101635 A1    Apr. 12, 2018

(51) Int. Cl.
*G06F 17/50* (2006.01)
*G06F 16/22* (2019.01)
*G06F 16/58* (2019.01)

(52) U.S. Cl.
CPC .......... *G06F 17/5077* (2013.01); *G06F 16/22* (2019.01); *G06F 16/58* (2019.01); *G06F 17/509* (2013.01); *G06F 17/5095* (2013.01); *G06F 2217/36* (2013.01)

(58) Field of Classification Search
CPC .. G06F 17/5095; G06F 2217/36; G06F 17/50; G06F 17/5081; G06F 17/509; G06F 2217/74
USPC .............................. 716/126, 139; 703/1, 4, 8
See application file for complete search history.

(56) References Cited

U.S. PATENT DOCUMENTS

| | | | | |
|---|---|---|---|---|
| 7,558,705 B1* | 7/2009 | Hughes | ................. | G06F 17/509 174/34 |
| 8,949,751 B2* | 2/2015 | Hadley | ............... | G06F 17/5095 703/1 |
| 2005/0119773 A1* | 6/2005 | Hashima | ............. | B60R 16/0207 700/97 |
| 2012/0271596 A1* | 10/2012 | Hadley | ............... | G06F 17/5095 703/1 |

* cited by examiner

*Primary Examiner* — Nghia M Doan
(74) *Attorney, Agent, or Firm* — Rankin, Hill & Clark LLP

(57) ABSTRACT

A method for generating a three-dimensional (3D) computer model of an assembly that includes wiring routing, which includes creating a part data structure that defines a part in a virtual product management system. The part data structure includes a plurality of nodes that define at least 3D part design data, 3D wiring routing design data and wiring routing annotation data of the part. The method includes importing at least the 3D part design data, the 3D wiring routing design data and the wiring routing annotation data to the part data structure from a computer-aided design (CAD) model system and generating a 3D computer model of the assembly. The method also includes transmitting the 3D computer model of the assembly to an electronic end user device.

19 Claims, 12 Drawing Sheets

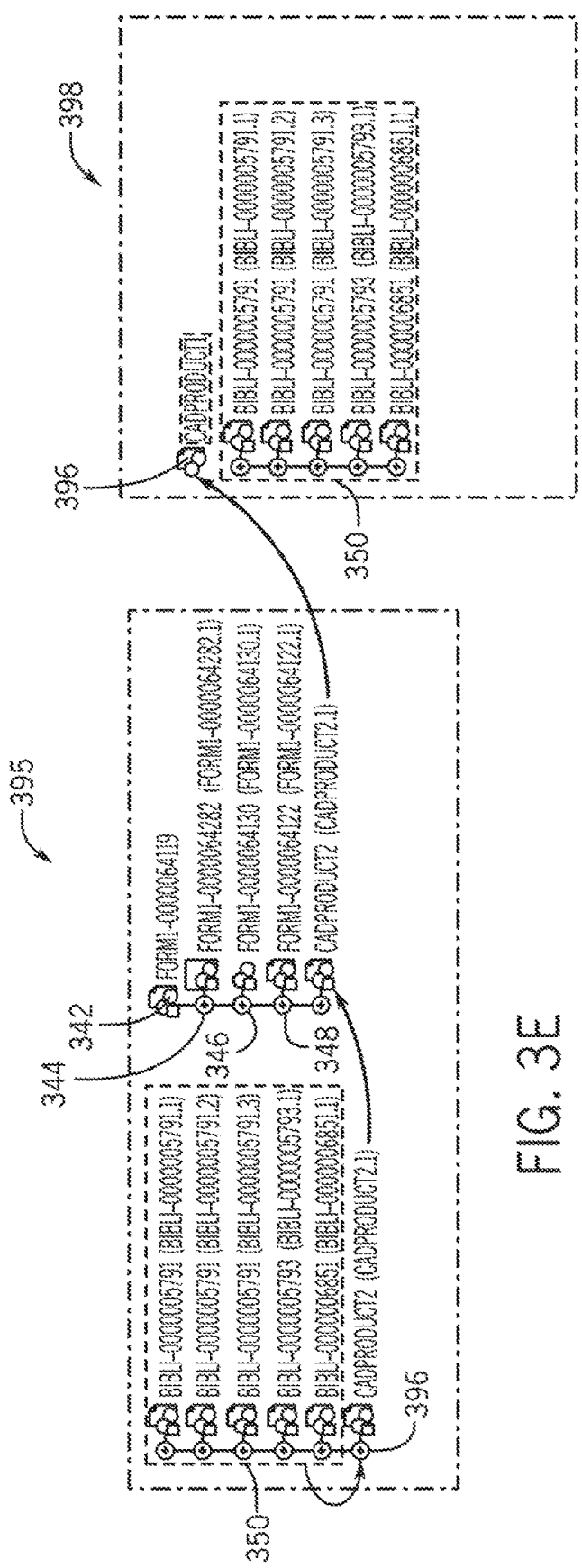

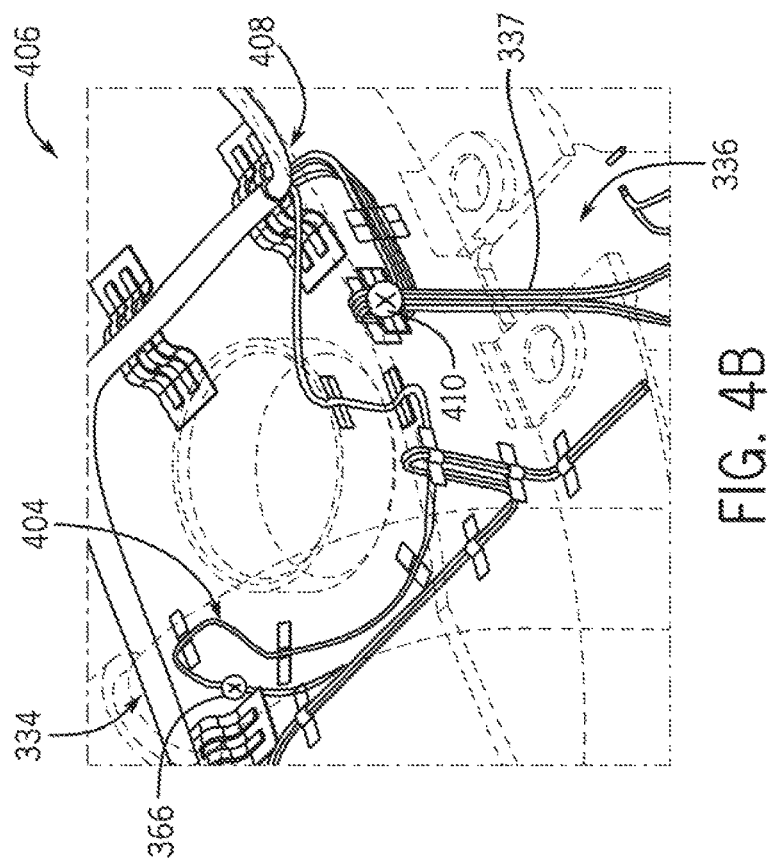
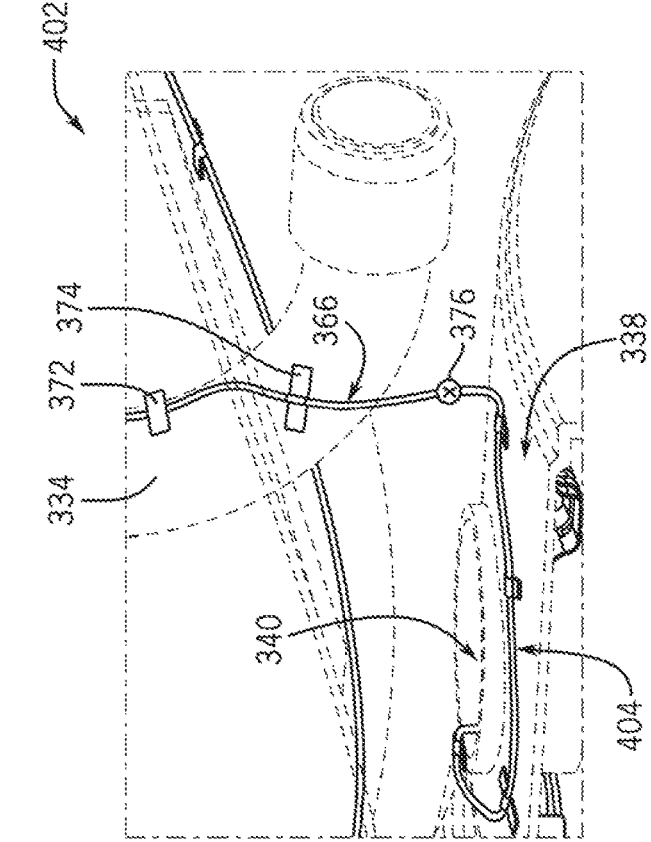
FIG. 4B
FIG. 4A

SYSTEM AND METHOD FOR PRODUCT DATA MANAGEMENT AND 3D MODEL VISUALIZATION OF ELECTRICAL WIRING DESIGN AND SPECIFICATIONS

BACKGROUND

Complex systems, for example, aircraft engine systems, are composed of multiple interconnected parts and multiple interconnected wiring systems. Design and assembly of such systems includes defining the wiring routing for each part and any wiring connections between multiple parts. The placement, sensors, and technical guidelines of the wiring routing influence the design, assembly, and production time. In some systems, the physical and logical information of such complex systems, including the wiring routing, are based on drawings, two-dimensional (2D) views, three-dimensional (3D) views, and specification documents. This information can be distributed between multiple storage systems and product data management systems, thereby making it difficult to manage the information and design revisions. Accordingly, a dynamic 3D model visualization of complex systems, including wiring routing, can help realize precise design, assembly, and decrease production time.

SUMMARY

According to one aspect, a computer-implemented method for generating a three-dimensional (3D) computer model of an assembly including wiring routing, includes, creating a part data structure defining a part in a virtual product management system and storing the part data structure in a virtual product management database. The part data structure includes a plurality of nodes defining at least 3D part design data, 3D routing design data and wiring routing annotation data of the part. The method includes importing at least the 3D part design data, the 3D wiring routing design data and the wiring routing annotation data to the part data structure from a computer-aided design (CAD) model system. The CAD model system is operably connected for computer communication to the virtual product management system and the virtual product management database. Further, the method includes generating a 3D computer model of the assembly including one or more parts based on one or more part data structures stored in the virtual product management database. The 3D computer model of the assembly combines the 3D part design data, the 3D wiring routing design data and the wiring routing annotation data. The method also includes transmitting the 3D computer model of the assembly to an electronic end user device.

According to another aspect, a system for generating a three-dimensional (3D) computer model of an assembly including wiring routing, includes a virtual product management system operably connected for computer communication to a virtual product management database and a computer-aided design (CAD) model system. The CAD model system is operably connected for computer communication to the virtual product management system and the virtual product management database. An electronic end user device is operably connected for computer communication to the virtual product management system. Further, a processor is operably connected for computer communication to the virtual product management system, the virtual product management database, the CAD model system, and the electronic end user device. The processor is configured to create a part data structure defining a part in the virtual product management system and store the part data structure in the virtual product management database. The part data structure includes a plurality of nodes defining at least 3D part design data, 3D wiring routing design data and wiring routing annotation data of the part. The processor is configured to import at least the 3D part design data, the 3D wiring routing design data and the wiring routing annotation data to the part data structure from the CAD model system. The processor is also configured to generate a 3D computer model of an assembly including one or more parts based on one or more part data structures stored in the virtual product management database. The 3D computer model of the assembly combines the 3D part design data, the 3D wiring routing design data and the wiring routing annotation data. Further, the processor is configured to transmit the 3D computer model of the assembly to the electronic end user device for display.

According to a further aspect, a non-transitory computer-readable storage medium storing instructions that, when executed by a computer, causes the computer to perform a method including instantiating a part data structure defining a part in a virtual product management system and storing the part data structure in a virtual product management database. The part data structure includes a plurality of nodes defining at least 3D part design data, 3D wiring routing design data and wiring routing annotation data of the part. The method includes importing at least the 3D part design data, the 3D wiring routing design data and the wiring routing annotation data to the part data structure from a computer-aided design (CAD) model system. The method also includes generating a 3D computer model of an assembly including one or more parts based on one or more part data structures stored in the virtual product management database. The 3D computer model of the assembly combining the 3D part design data, the 3D wiring routing design data and the wiring routing annotation data. Further, the method includes transmitting the 3D computer model of the assembly to an electronic end user device.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

FIG. 3E is a simplified exemplary user interface for 3D model visualization illustrating creating a new CAD product with standards data of the part according to an exemplary embodiment;

FIG. 3F is a simplified exemplary user interface for 3D model visualization illustrating the new CAD product of FIG. 3E and importing and linking the new CAD product to a standard node of the part according to an exemplary embodiment;

FIG. 4A is a schematic diagram of a mockup assembly according to an exemplary embodiment;

FIG. 4B is a schematic diagram of the mockup assembly of FIG. 4A from a different view according to an exemplary embodiment;

DETAILED DESCRIPTION

Figure 1:
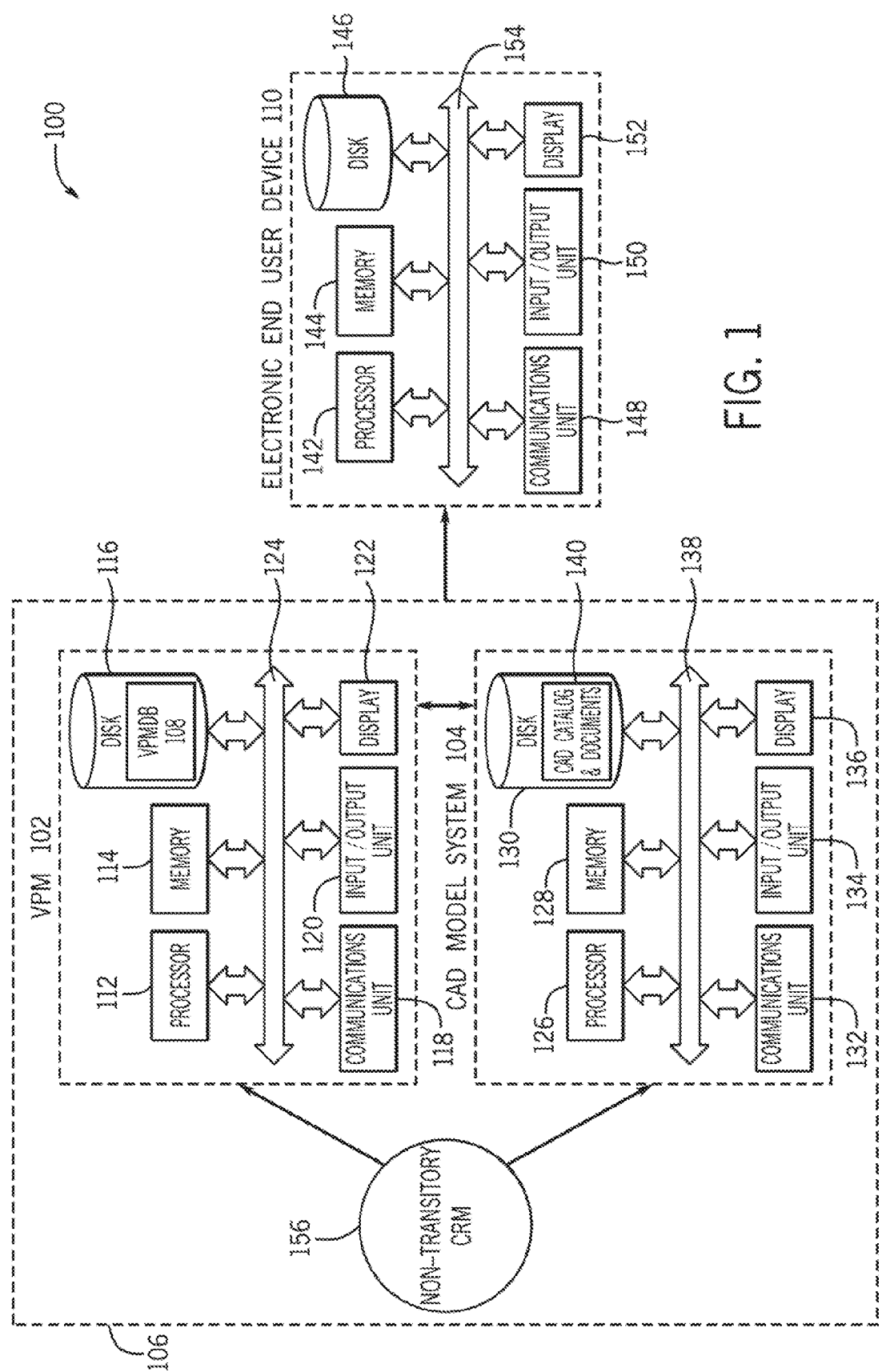
FIG. 1 is a block diagram of an illustrative operating environment implementing systems and methods for product data management and 3D model visualization of electrical wiring design and specifications according to an exemplary embodiment.

The following includes definitions of selected terms employed herein. The definitions include various examples and/or forms of components that fall within the scope of a term and that can be used for implementation. The examples are not intended to be limiting. Further, the components discussed herein, can be combined, omitted or organized with other components or into organized into different architectures.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "database", as used herein can refer to table, a set of tables, a set of data stores (e.g., disks) and/or methods for accessing and/or manipulating those data stores.

An "input/output" device, as used herein, can include a keyboard, a microphone, a pointing and selection device, cameras, imaging devices, video cards, displays, a disk, network devices, among others. The input/output device can include input/output ports, for example, serial ports, parallel ports and USB ports.

"Logic", as used herein, includes but is not limited to hardware, firmware, a non-transitory computer readable medium that stores instructions, and/or combinations of each to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

A "memory", as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can store an operating system that controls or allocates resources of a computing device.

A "processor", as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multi-core processors and co-processors and other multiple single and multicore processor and co-processor architectures. The processor can include various modules to execute various functions.

I. System Overview

Referring now to the drawings, wherein the showings are for purposes of illustrating one or more exemplary embodiments and not for purposes of limiting same, FIG. 1 is a block diagram of an illustrative operating environment implementing systems and methods for product data management and three-dimensional (3D) model visualization of electrical wiring design and specifications according to an exemplary embodiment. The components shown in FIG. 1, as well as the components of other systems, hardware architectures, and software architectures discussed herein, can be combined, omitted, or organized into different architectures for various embodiments.

In general, the systems and methods discussed herein relate to the creation of 3D models for use in the assembly of a complex system, for example, an aircraft engine system. These complex systems can include one or more assemblies and each assemblies can include one or more parts. Further, each assembly and each part can be interconnected to other assemblies and other parts. The 3D models incorporate 3D representations of parts with specification (e.g., annotations, connotations) data, including measurements, guidelines, and standards, among others. Thus, 3D views with 2D data can be visualized. Accordingly, the system 100 of FIG. 1 can include a virtual product management (VPM) system 102 and a computer-aided design (CAD) model system 104. In some embodiments, the VPM system 102 and the CAD model system 104 can reside on the same computing device 106 and share similar components (e.g., a processor, a memory). In other embodiments, the VPM system 102 and the CAD model system 104 can reside on separate distributed systems (e.g., computing devices, servers). It is understood that various configurations and architectures of the VPM system 102 and the CAD model system 104 can be implemented with the systems and methods discussed herein.

The VPM system 102 can comprise any number of different systems, for example, ENOVIA software and systems. Generally, the VPM system 102 manages the models and components that make up an assembly. In particular, as discussed herein, the VPM system 102 stores and manages linked data structures of parts and assemblies that define parts and assemblies. As will be discussed herein, the VPM system 102 is operably connected for computer communication to a virtual product management database (VPMDB) 108 that stores the linked data structures.

Further, the VPM system 102 and is capable of integrating 3D models with 2D data facilitated by the CAD model system 104. Thus, the CAD model system 104 is operably connected for computer communication to the VPM system 102 and the VPMDB 108. The CAD model system 104 can comprise any number of different systems, for example, CATIA software and systems.

The system 100 of FIG. 1 also includes an electronic end user device 110 operably connected for computer communication to the VPM system 102. The electronic end user device 110 can include any computing device, for example, a portable device, a tablet, a smartphone, a wearable computing device, among others. As will be discussed herein, the electronic end user device 110 receives and displays the 3D models generated by the VPM system 102 and the CAD model system 104. Thus, a user (not shown) can view up-to-date 3D models include 3D and 2D data to facilitate production of complex systems.

The hardware and architecture of the VPM system 102 and the CAD model system 104 will now be discussed in more detail. In FIG. 1, the VPM system 102 includes a processor 112, a memory 114, a disk 116, a communications unit 118, an input/output (I/O) unit 120 and a display 122. Each of these components can be operably connected for computer communication via a bus 124 and/or other wired and wireless technologies. The processor 112 generally provides execution and control of system functions for product data management and 3D model visualization of electrical wiring design and specifications. As discussed above, the VPMDB 108 stores linked data structures defining parts and assemblies. In FIG. 1, the VPMDB 108 is located on the disk 116.

The communications unit 118 provides software and hardware to facilitate data input and output between the components of the VPM system 102 and other components, networks, and data sources, for example, the CAD model system 104 and the electronic end user device 110. The I/O unit 120 can receive input from, for example, a user (not shown) operating the VPM system 102. Further, the display 122 can be a display screen, for example, a liquid crystal display (LCD), an electroluminescent display (ELD) device, a field emission display (FED) device, a plasma display panel (PDP), a thin film transistor LCD (TFT-LCD) display, a flexible display, an organic light-emitting diode (OLED), an active-matrix organic light-emitting diode (AMOLED), etc. The display may also include touch input/output capabilities.

The CAD model system 104 and the electronic end user device 110 can include similar components with similar functionality as described above with the VPM system 102. For example, the CAD model system 104 can include a processor 126, a memory 128, a disk 130, a communications unit 132, an input/output (I/O) unit 134, a display 136, and a bus 138. In one embodiment, the disk 130 includes CAD catalogs and documents 140 that can include specifications, for example, CATIA V5 documentation. Further, the electronic end user device 110 can include a processor 142, a memory 144, a disk 146, a communications unit 148, an input/output (I/O) unit 150, a display 152, and a bus 154.

Accordingly, the VPM system 102 is operably connected for computer communication with the virtual product management database 108, the CAD model system 104, and the electronic end user device 110. As discussed above, the processor 112 is configured to provide execution and control of system functions for product data management and 3D model visualization of electrical wiring design and specifications. The processor 112 can use computer implemented instructions (e.g., logic), stored, for example, on a non-transitory computer readable medium 156 and loaded into the memory 114 for execution by the processor 112. In is understood that the same functionality can be performed by the CAD model system 104 via the processor 126 and the non-transitory computer readable medium 156.

In one embodiment, the processor 112 is configured to create a part data structure defining a part in the VPM system 102 and store the part data structure in the VPMDB 108. The part defined by the part data structure can be one of many parts that comprise an assembly. The part data structure includes a plurality of nodes defining at least 3D part design data, 3D wiring routing design data, and wiring routing annotation data of the part. In some embodiments, 3D part design data can include 3D physical data defining the part and/or the context of the part (e.g., other parts instrumented with the part). The 3D wiring routing design data can include 3D physical data defining the wiring routing design of the part and other specifications and standards of the wiring routing design (e.g., logical data). Further, wiring routing annotation data of the part can include logical data defining, including annotations, specifications, standards, and data from 2D documents, of the part and the wiring routing.

II. Part Data Structure

The part data structure will now be described in more detail with reference to FIG. 2. As discussed herein, an assembly of a complex system, for example, an aircraft engine assembly, can include multiple parts. Thus, multiple parts can be interconnected to form an assembly. The data structures defining the assembly and the parts can be stored in the VPMDB 108. A data structure defining an assembly will be discussed herein with reference to FIG. 5.

Figure 2:
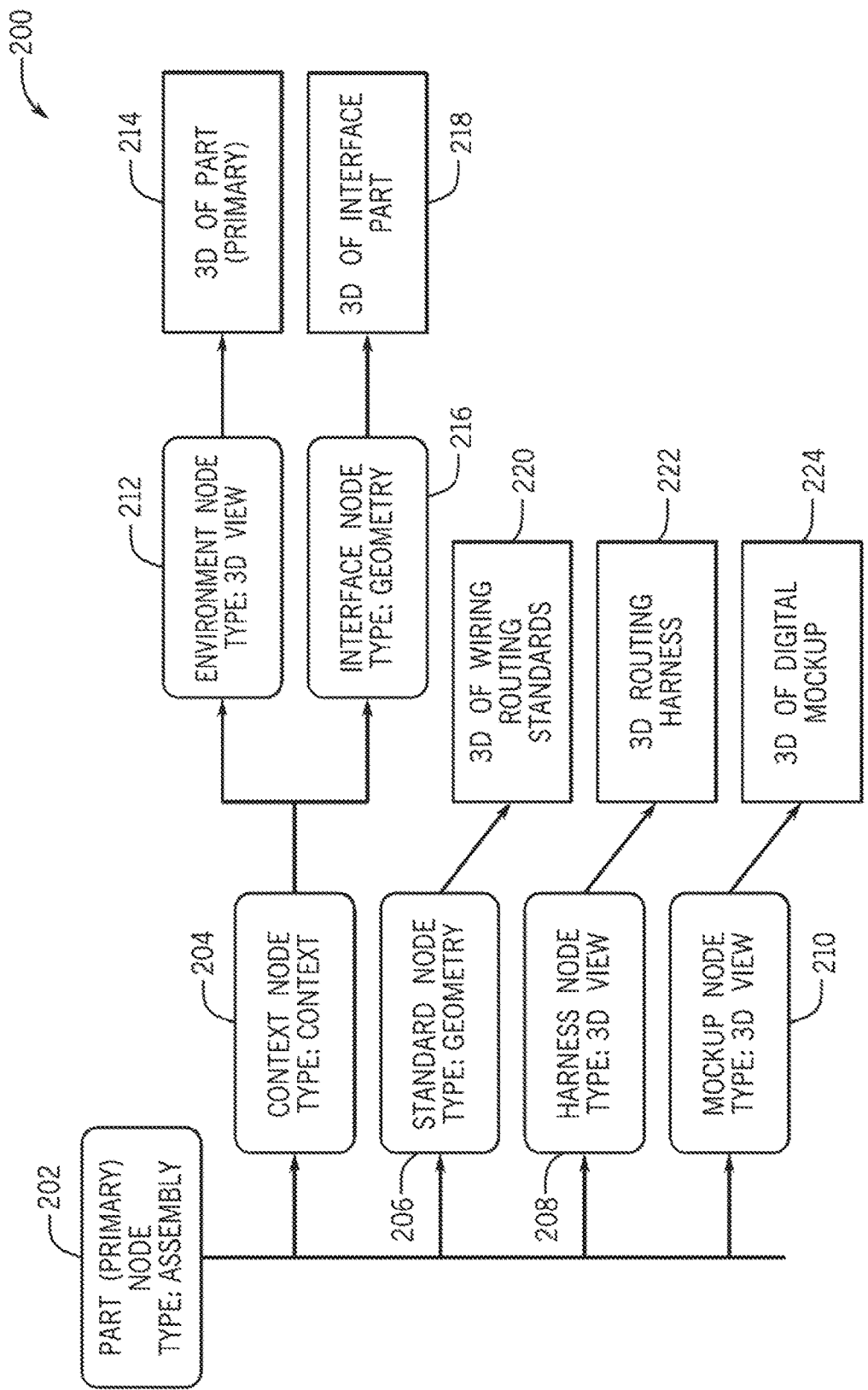
FIG. 2 is a schematic diagram of an exemplary linked data structure of a part node stored in a product data management database according to an exemplary embodiment.

Referring now to FIG. 2, a schematic diagram of an exemplary linked part data structure 200 stored in a product data management database according to an exemplary embodiment is shown. The part data structure 200 can be part of an assembly data structure as will be discussed with FIG. 5. In FIG. 2, a part node 202 can define a part (also referred to herein as a primary part), for example, an aircraft engine tube that is part of an aircraft engine assembly. The part node 202 is a root node that includes a plurality of nodes with data that define the part. It is understood that the term node, as used herein, can also be referred to as a data container. Further, it is understood that each node can contain data and can link to other nodes, for example, via pointers. In FIG. 2, the part node 202 includes a context node 204, a standard node 206, a harness node 208, and a mockup node 210, although it is understood that other nodes and any other number of nodes can be implemented.

Each node can be a particular node type (e.g., a node property). For example, a context node type can include data that defines the context of the part driven by other parts. A geometry node type can include geometrical feature data. A 3D view node type can include data defining parts and points situated in a 3D space. It is understood that other node types can be implemented with the data structures described herein. As will be discussed herein, once the part data structure 200 is created, the nodes of the part data structure 200 are linked to data and/or nodes generated from, for example, the CAD model system 104.

In FIG. 2, the context node 204 defines the context for 3D representation of the part. In particular, the context node 204 includes an environment node 212 and an interface node 216. The environment node 212 defines a 3D environment representation (e.g., view) of the instrumentation in which the part is located. In FIG. 2, the environment node 212 is linked to a 3D representation of the part as indicated by block 214. The 3D representation of the part, as will be discussed herein, can be imported from the CAD model system 104.

The interface node 216 defines a geometric representation (e.g., geometric features) of an interface between the part (e.g., the primary part) and another part (e.g., a secondary primary part). The interface node 216 can also define temporary end points between the part and another part. In FIG. 2, the interface node 216 is linked to a 3D representation of the interface part as indicated by block 218. The 3D representation of the interface part, as will be discussed herein, can be imported from the CAD model system 104.

The standard node 206 defines a 3D geometric representation (e.g., geometric features) of a wiring routing (e.g., wiring muting standards) of the part. The standard node is linked to a 3D representation of wiring routing standards as indicated by block 220. The 3D representation of wiring routing standards, as will be discussed herein, can be imported from the CAD model system 104.

The harness node 208 defines a 3D representation (e.g., view) of the wiring routing harness of the part. In FIG. 2, the harness node 208 is linked to a 3D representation of the routing harness as indicated by block 222. The 3D representation of the routing harness of the part, as will be discussed herein, can be imported from the CAD model system 104.

Figure 5:
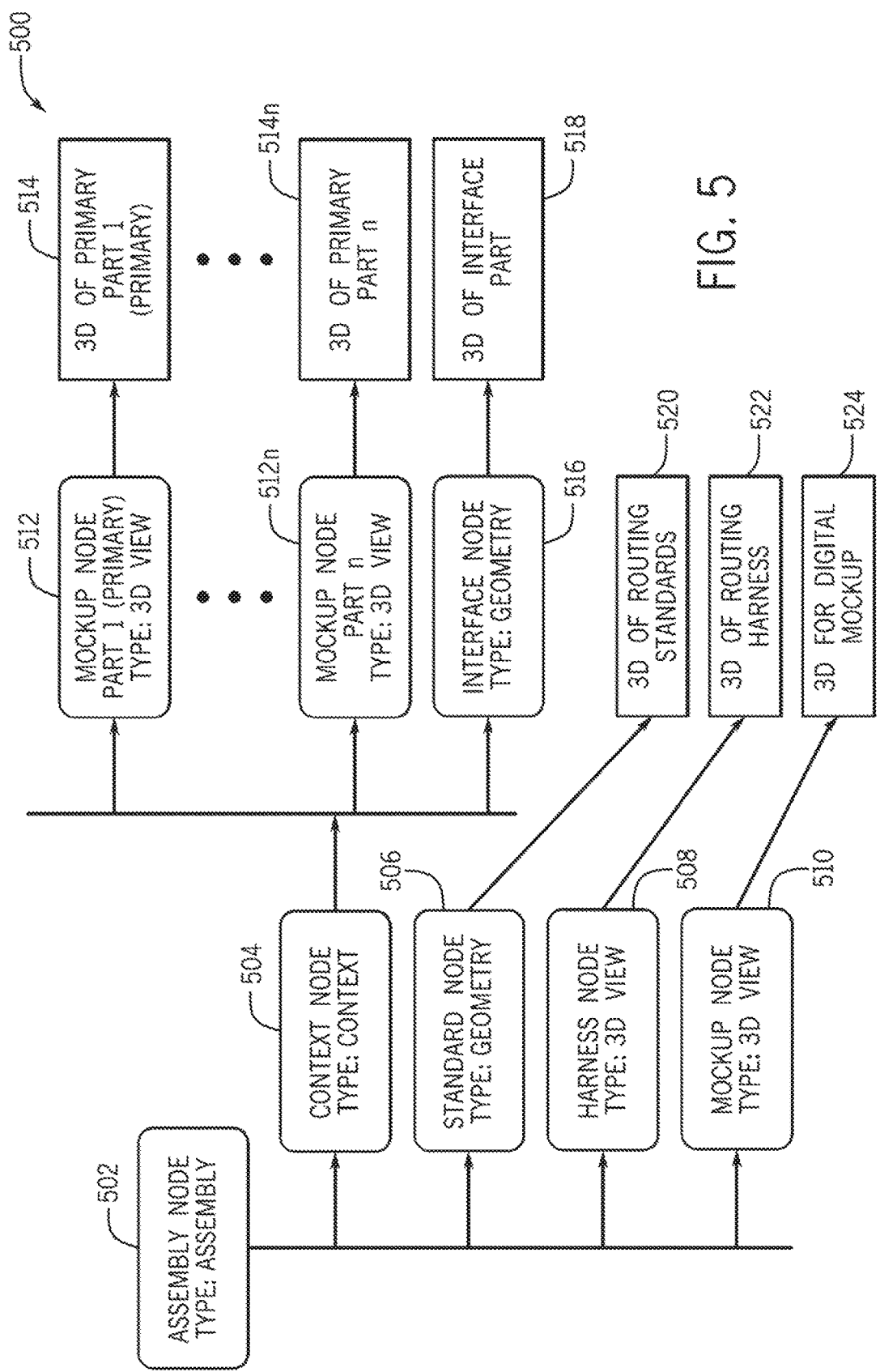
FIG. 5 is a schematic diagram of an exemplary linked data structure of a an assembly contacting one or more mockup nodes of one or more parts stored in a product data management database according to an exemplary embodiment.

Further, the mockup node 210 defines a 3D representation (e.g., view) of a mockup of the part including all of the data defined within the part node 202. The 3D representation of the mockup of the part can be transmitted to the electronic end user device 110. Further, the 3D representation of the mockup of the part can be a part of an assembly data structure (FIG. 5). In FIG. 2, the mockup node 210 is linked to a 3D representation of a digital mockup of the part as indicated by block 224. The 3D representation of the mockup part, as will be discussed herein, can be imported from the CAD model system 104. The creation and generation of the part data structure and the associated nodes will now be described in more detail III. Creating and Importing CAD Data to Part Data Structure In general, the functions of the VPM system 102 and the CAD Model System 104 are integrated to import and link data created and/or generated by the CAD model system 104 to the part data structure 200. The part data structure 200 is stored in the VPMDB 108 and can be used as a part of an assembly data structure (See FIG. 5). An exemplary operation will now be described for each node with respect to illustrative examples shown in FIGS. 3A-3F and with reference to the components of FIGS. 1 and 2. For simplicity, like numerals representing like elements are used throughout FIGS. 3A-3F.

As discussed above, the processor 112 can be configured to import at least the 3D part design data, the 3D wiring routing design data and the wiring routing annotation data to the part data structure 200 from the CAD model system 104. In one embodiment, the 3D part design data can be imported to the context node 204, including the environment node 212 and the interface node 216. In particular, the 3D part design data can be imported to the part data structure 200 from the CAD model system 104.

Figure 3A:
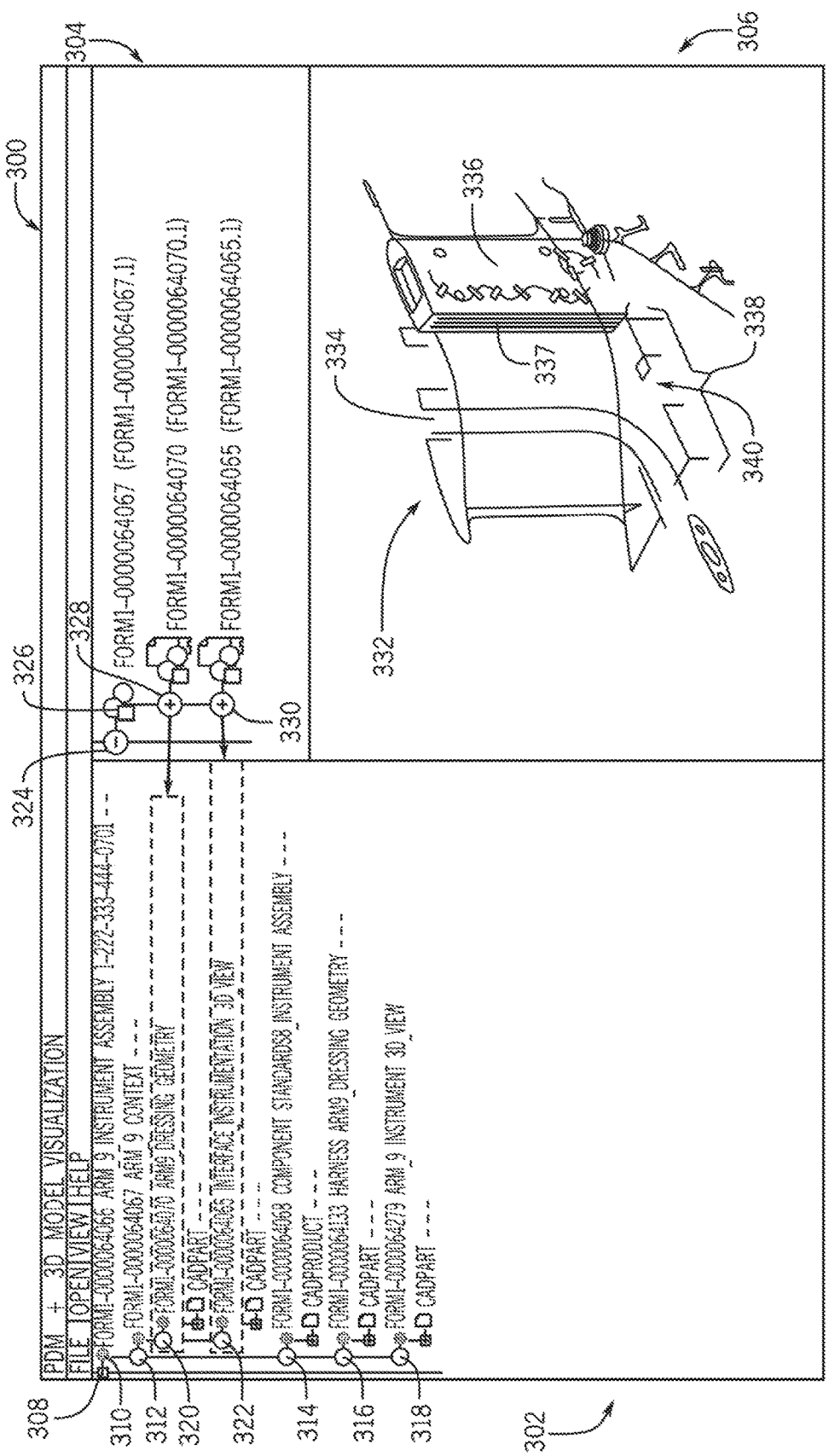
FIG. 3A is an exemplary user interface for 3D model visualization illustrating importing and linking of 3D part design data to a context node of a part according to an exemplary embodiment.

Referring now to FIG. 3A, an exemplary user interface for 3D model visualization is shown illustrating importing 3D part design data to a context node of a part according to an exemplary embodiment. In FIG. 3A, a user interface 300 illustrates an exemplary user interface of a system for generating a 3D computer model of an assembly including wiring routing that can integrate VPM and CAD functionality. The user interface 300 is divided into three windows where each window has a specific purpose. It is understood that in other embodiments, the user interface 300 can be divided into any number of windows.

The windows include a VPM navigation window 302, a CAD specification window 304, and a CAD design workspace window 306. It is understood that in other embodiments, the VPM navigation window 302, the CAD specification window 304, and the CAD design workspace window 306 could have separate interfaces (e.g., not combined into one interface). In one embodiment, the user interface 300 can be presented on the display 122 of the VPM system 102.

The user interface 300 can receive input (e.g., via I/O unit 120) from a user (not shown).

Within the VPM navigation window 302, a VPM specification tree 308 is shown that generally provides navigation of data defining an assembly and/or a part. In particular, the VPM specification tree 308 includes nodes (e.g., data containers) corresponding to the part data structure 200. Thus, the VPM specification tree 308 displays the part data structure 200 of FIG. 2 and the VPM specification tree 308 includes a plurality of nodes including those nodes described with respect to FIG. 2 and data stored in said nodes. The part data structure defined in the VPM specification tree 308 can be created and/or instantiated in the VPM system 102 and stored in the VPMDB 108.

Similar to the part data structure 200 of FIG. 2, the VPM specification tree 308 includes a part node 310 (e.g., root node), a context node 312, a standard node 314, a harness node 316 and a mockup node 318. Further, the context node 312 includes an environment node 320 and an interface node 322.

Each node under the part node 310 is linked to corresponding data (e.g., CADPart, CADProduct) defining each node and imported from the CAD model system 104. It is understood that the phrase "CAD" can be used interchangeably with the phrase "CAT" (e.g., CATPart, CATProduct). In FIG. 3A, the corresponding data (e.g., blocks 214, 218, 220, 222, 223) is nested underneath the related node.

As shown in the CAD specification window 304, a CAD specification tree 324 is shown with a plurality of nodes (e.g., data containers) that define a CAD part 326. The CAD part 326 and the plurality of nodes defining the CAD part 326 are generated from user input (e.g., design input into the CAD design workspace window 306) and/or data loaded into the CAD model system 104, for example, CAD catalogs and documents 140. The CAD part 326 can be imported to the context node 312 of the part node 310 of the VPM system 102. The CAD part 326 includes a CAD contextual part 328 and a CAD contextual part 330. The CAD contextual part 328 can be imported to the environment node 320 of the context node 312 of the VPM system 102. The CAD contextual part 330 can be imported to the interface node 322 of the context node 312 of the VPM system 102.

To generate the CAD part 326 and the specifications of the part (e.g., the nodes of the CAD part 326), a user (not shown) can design the part using the CAD model system 104 and generate a graphical representation of the part using the CAD model system 104. Thus, the user can input data within the CAD design workspace window 306. In the CAD design workspace window 306, a CAD 3D representation 332 of a part and the environment (e.g., context) of the part is shown. The components shown in the CAD 3D representation 332 can be loaded from the CAD model system 104 and configured by the user.

In this example, a primary part 334, an aircraft oil tube is shown. The environment (e.g., the context) of the primary part 334 includes a secondary primary part 336, a strut, and an interface 338. The interface 338 allows for interconnection between the primary part 334 and the secondary primary part 336, for example, via an aperture 340. The interface 338 can also include temporary end points of wiring routing (not shown) between the primary part 334 and the secondary primary part 336.

As these components are loaded, created and/or modified in the CAD model system 104, the CAD specification tree 324 is populated with data and dynamically updated. Thus, in FIG. 3A, the CAD contextual part 328 defines the context of the primary part 334 including parts and points of the primary part 334 in a 3D space included in the instrumentation of the primary part 334. The CAD contextual part 328 can also include 3D view data defining the context of the secondary primary part 336. Further, the CAD contextual part 330 includes geometric data defining the context of the interface 338 between the primary part 334 and the secondary primary part 336.

Accordingly, the processor 112 is configured to create a 3D representation of the context of the primary part 334 based on the user input into the CAD model system 104 (e.g., creation of CAD 3D representation 332) and specifications provided by the CAD model system 104 associated with the components of the CAD 3D representation 332. Further, as mentioned above, the processor 112 is configured to import at least the 3D part design data from the CAD model system 104. The 3D part design data can include the CAD contextual part 328 and the CAD contextual part 330. By importing at least the 3D part design data a dynamic link is created between the nodes (e.g., containers) from the CAD part 326 to the respective nodes of the part node 310 of the VPM system 102. In one embodiment, importing the 3D part design data includes copying the CAD contextual part 328 and the CAD contextual part 330 to respective components of the part node 310 of the VPM system 102. In another embodiment, importing the 3D part design data includes creating a dynamic link between the CAD contextual part 328 and the CAD contextual part 330 to respective components of the part node 310 of the VPM system 102.

Accordingly, in FIG. 3A, the arrow from the CAD contextual part 328 to the environment node 320 indicates importing the CAD contextual part 328 as data linked (e.g., block 214 of FIG. 2) to the environment node 320. This results in the CATPart nested under the environment node 320. Thus, a dynamic link between the CAD contextual part 328 and the VPM data structure is created. Similarly, the arrow from the CAD contextual part 330 to the interface node 322 indicates importing the CAD contextual part 330 as data linked (e.g., block 218 of FIG. 2) to the interface node 322. This results in the CATPart nested under the interface node 322. Thus, a dynamic link between the CAD contextual part 330 and the part data structure in the VPM system 102 is created and the data imported can be stored in the part data structure.

Further, the processor 112 can be configured to import at least the 3D part design data, the 3D wiring routing design data and the wiring routing annotation data to the part data structure 200 from the CAD model system 104. For example, the 3D representation of the wiring routing harness, the 3D representation of the mockup part, and the 3D representation of wiring routing harness standards can be linked to the part data structure 200. Accordingly, importing said data with respect to the standard node 206 and the harness node 208 will now be described with an illustrative example shown in FIG. 3B.

Figure 3B:
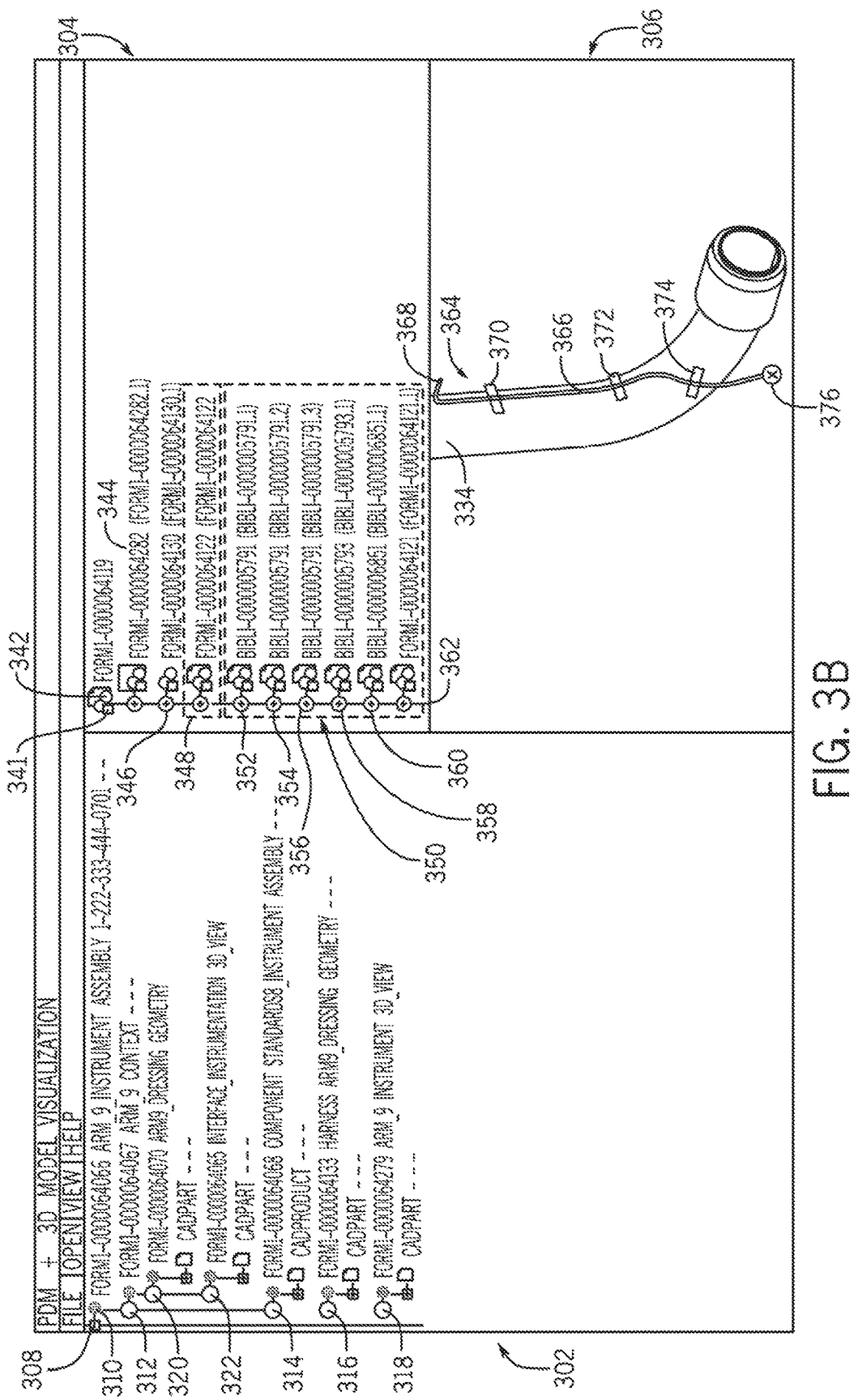
FIG. 3B is an exemplary user interface for 3D model visualization illustrating creating, importing and linking 3D part design data and 3D wiring routing design data of the part of FIG. 3A to a standard node and/or a harness node of the part according to an exemplary embodiment.

As discussed above, the part data structure can include at least 3D wiring routing design data. The 3D wiring routing design data can include the physical design data of a wiring routing of a part, which can be stored and/or linked to the standard node 206 (e.g., block 220) and/or the harness node 208 (e.g., block 222). Thus, the 3D wiring routing design data can be imported and/or linked to the part data structure 200 from the CAD model system 104. FIG. 3B is an exemplary user interface for 3D model visualization illustrating creating, importing and linking 3D part design data and 3D wiring routing design data of the part of FIG. 3A to a standard node and/or a harness node of the part according to an exemplary embodiment.

As discussed above, the data stored in each node of the part data structure 200 can be imported from the CAD model system 104. Thus, as shown in FIG. 3B, the CAD specification window 304, a CAD specification tree 341 is shown with a plurality of nodes (e.g., data containers) that define a CAD part 342. The CAD part 342 and the plurality of nodes defining the CAD part 342 are generated from user input (e.g., design input into the CAD design workspace window 306) and/or data loaded into the CAD model system 104, for example, CAD catalogs and documents 140. In FIG. 3B, the CAD specification tree 341 includes a contextual CAD part 344 that can define the mockup node 318 of the VPM part data structure. The mockup node 318 will be discussed in more detail with FIGS. 3C and 3D.

A CAD sub-product 346 can define 3D design data of a primary part and can define part of the mockup node 318 of the VPM part data structure. A CAD contextual part 348 can define 3D design data, 3D wiring routing design data and wiring routing annotation data thereby defining a complete wire harness definition of the primary part, specifically, the harness node 316 of the part node 310 of the VPM system 102. The CAD contextual part 348 can also be a part of the mockup node 318 of the VPM part data structure. CAD contextual parts 350 define the standards of the wire harness routing (e.g., including 3D wiring routing design data) of the primary part and in part, can define the standard node 314 and/or the mockup node 318 of the part node 310 of the VPM system 102. Thus, the CAD contextual parts 350 define the complete 3D wiring routing design data of the primary part and includes CAD contextual parts 352, 354, 356, 358 and 360. In some embodiments, the CAD contextual parts 350 can also include a CAD part component 362.

Similar to FIG. 3A, to generate the CAD part 342 and the specifications of the part (e.g., the nodes of the CAD part 342), a user can design the part using the CAD model system 104 and generate a graphical representation of the part using the CAD model system 104. Thus, the processor 112 can be configured to create a 3D representation of a wiring routing harness 366 on a surface of the primary part 334 based at least upon user input received by the CAD model system 104. The 3D representation of the wiring routing harness on the part defines the design of the wiring routing on the surface of the part.

In one embodiment, the user can input data within the CAD design workspace window 306. In the CAD design workspace window 306, a drawing view 364 of a part and a wiring routing harness is shown. The components shown in the drawing view 364 can be loaded from the CAD model system 104 and configured by the user. The primary part 334, an aircraft oil tube, includes a wiring routing harness 366 with various sensors, standards and components. More specifically, the primary part 334 includes a sensor 368, a bracket 370, a bracket 372, and a bracket 374. The wiring routing harness 366 is routed on the primary part 334 with the components discussed above. Further, a temporary end point 376 can be created which identifies an end point of the wiring routing harness 366 that can be connected to a point of a wiring of a secondary primary part 336 via the interface 338.

A user (not shown) can design the primary part 334 and the wiring routing using the CAD model system 104 thereby generating the graphical representation of the primary part 334 with the wiring routing. As the user designs the primary part 334, corresponding data is populated in the CAD navigation tree 341. In this example, the CAD contextual parts 352, 354, and 356 define brackets 370, 372, and 374, respectively. The CAD contextual parts 352, 354, and 356 can be imported to the standard node 314 of the part node 310 of the VPM system 102. The CAD contextual part 358 defines the sensor 368 and can be imported to the standard node 314 of the part node 310 of the VPM system 102. Further, the CAD contextual part 360 defines a temperature sensor and can be imported to the standard node 314 of the part node 310 of the VPM system 102.

As mentioned above, the CAD part component 362 defines the temporary end point 376 can be imported to the interface node 322 of the part node 310 of the VPM system 102. In another embodiment, the CAD part component 362 can be imported to the standard node 314 of the part node 310 of the VPM system 102. By importing at least the 3D part design data, a dynamic link is created between the nodes (e.g., containers) for the CAD part 342 to the respective nodes of the part node 310 of the VPM system 102.

Figure 3C:
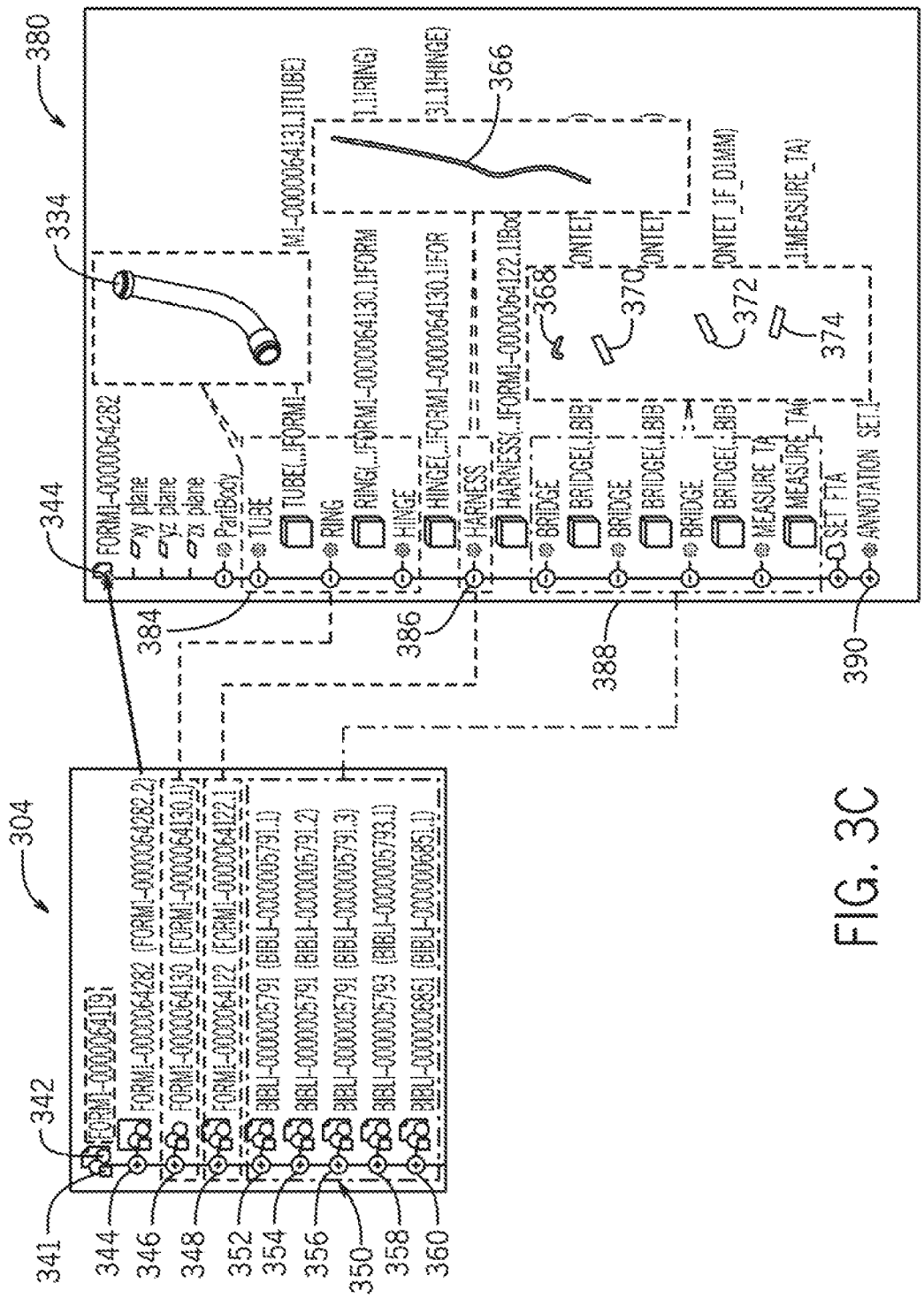
FIG. 3C is a simplified exemplary user interface for 3D model visualization illustrating importing and linking of 3D part design data and 3D wiring routing design data of the part of FIG. 3A to a mockup node of the part according to an exemplary embodiment.

In one embodiment, the processor 112 is further configured to create a 3D representation of a mockup part in a CAD document of the CAD model system 104, the 3D representation of the mockup part including the 3D representation of the wiring routing harness on the surface of the part, and augmenting the CAD document with the wiring routing annotation data based on user input received by the CAD model system. Creating and importing all components needed for the mockup node will now be described with respect to FIGS. 3C and 3D. FIG. 3C is a simplified exemplary user interface for 3D model visualization illustrating importing and linking of 3D part design data and 3D wiring routing design data of the part of FIG. 3A to a mockup node of the part according to an exemplary embodiment. To create and import the data needed for the mockup node, a new CAD document is created for the part.

In FIG. 3C, the CAD specification window 304 includes a new CAD document 380 which shows an expanded view of the CAD part 344 for mockup. Here, all of the features of the routing harness, including the CAD sub product 346, the CAD contextual part 348 and the CAD contextual parts 350 are linked to the CAD document 380. In FIG. 3C, the specifications of the CAD part for mockup 344 are shown linked to their respective nodes of the CAD specification tree 341. Specifically, CAD parts 384 are linked to CAD sub product 346, CAD part 386 is linked to CAD contextual part 348, and CAD parts 388 are linked to CAD contextual parts 350. Further, the specifications of the CAD part for mockup 344 are shown with an annotation set 390, which will be described in further detail with FIG. 3D.

Figure 3D:
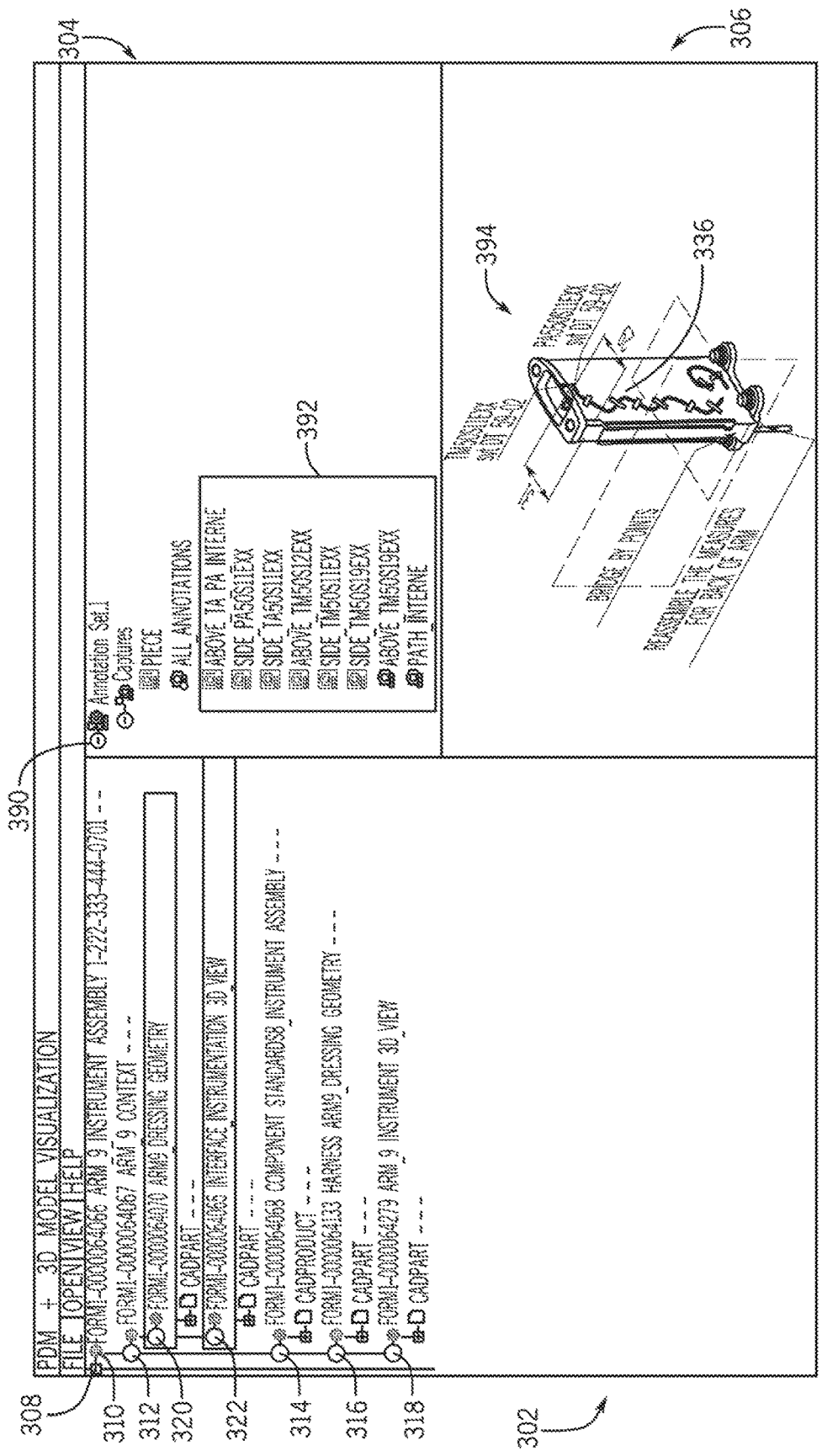
FIG. 3D is an exemplary user interface for 3D model visualization illustrating creating, importing and linking wiring routing annotation data of the part of FIG. 3A to a mockup node of the part according to an exemplary embodiment.

FIG. 3D is an exemplary user interface for 3D model visualization illustrating creating, importing and linking wiring routing annotation data of the part of FIG. 3A to a mockup node of the part according to an exemplary embodiment. In particular, the annotation set 390 defines annotation specifications 392 for the primary part 334. The annotation specifications 392 can be from 2D views of the part and specification documents. A user (not shown), can place annotations 394 on the secondary primary part 336. In some embodiments, the secondary primary part 336 can be augmented with the annotations 394. A capture is created of the secondary primary part 336 including the annotations 394 and added to the new document 380. The new document 380 is then imported to the mockup node 318 of the part node 310 of the VPM system 102.

Finally, a complete wiring routing definition is created by defining standards needed for the wiring routing definition. Thus, the processor 112 is further configured to create a 3D representation of wiring routing harness standards in the CAD model system 104. Creating the 3D representation of wiring routing harness standards includes generating a CAD product in the CAD model system 104 and linking standards instantiated in the 3D representation of the wiring routing harness to the CAD product.

FIG. 3E is a simplified exemplary user interface for 3D model visualization illustrating creating a new CAD product with standards data of the part according to an exemplary embodiment. A simplified user interface 395 illustrates a partial view of CAD contextual parts 350 and CAD part 342. A new CAD product 396 is created and linked to the CAD contextual parts 350. For example, the CAD contextual parts are copied to the new CAD product 396. The new CAD product 396 is linked to the CAD part 342. Further, the new CAD product 396 is opened in a new CAD window 398 and the new CAD product 396 is imported to the standard node 314 of the part data structure 200 (e.g., block 220). According to this process, part data structure 200 of the VPM system 102 now includes a full definition of the primary part. The resulting 3D view stored in the mockup node is used to generate a 3D representation of the part, which is transmitted to the electronic end user device 110.

Accordingly, FIG. 4A shows a schematic diagram 402 of a mockup assembly according to an exemplary embodiment and FIG. 4B illustrates a schematic diagram 406 of the mockup assembly of FIG. 4A from a different view according to an exemplary embodiment. In FIG. 4A, the primary part 334, including all wiring routing definitions, is shown with the interface part 338. Here, the temporary end point 376 illustrates a connection between the wire routing harness 366 of the primary part and the wire 404 of the interface part. In FIG. 4B, another temporary end point 410 illustrates a connection between the wire 404 of the interface part and the wire 337 of the secondary primary part 336.

IV. Assembly Data Structure

As mentioned above with FIG. 2, multiple parts (e.g., as defined by the part data structure 200) can be interconnected to form an assembly. The data structure defining the assembly can be stored in the VPMDB 108. The assembly data structure can be created and stored in the VPMDB 108 and include other part data structures (e.g., part data structure 200). Referring now to FIG. 5, a schematic diagram of an exemplary linked assembly data structure 500 stored in a product data management database according to an exemplary embodiment is shown. The assembly data structure 500 can include an assembly node 502 that defines an assembly, for example, an aircraft engine assembly. The assembly node 502 includes a plurality of nodes that define the assembly. It is understood that the term node, as used herein, can also be referred to as a data container. Further, it is understood that each node can contain data and can link to other nodes, for example, via pointers. In FIG. 5, the assembly node 502 includes a context node 504, a standard node 506, a harness node 508, and a mockup node 510, although it is understood that other nodes and any other number of nodes can be implemented. As mention above with FIG. 2, each node can be of a particular type and each node can store and/or link to associate data that defines the particular node for the assembly.

The context node 504 defines the context for 3D a representation of the assembly. In particular, the context node 504 includes digital mockups of one or more parts that are part of the assembly. For example, in FIG. 5, the context node 504 can include mockup node part 512 to mockup node part 512*n*. Each mockup node part is linked to a 3D representation of the part as indicated by blocks 514 and 514*n*. Further, the interface node 516 is linked to a 3D representation of the interface part as indicated by block 518. The interface node 516 can define an interface between the assembly and another assembly including temporary end points (not shown) of the connection of wiring routing from each part.

The standard node 506 defines a 3D representation (e.g., geometric features) of a wiring routing of the assembly. The standard node 506 is linked to a 3D representation of wiring routing standards as indicated by block 520. The harness node 508 defines a 3D representation of the wiring routing harness of the assembly. In FIG. 5, the harness node 508 is linked to a 3D representation of the routing harness as indicated by block 522. Further, the mockup node 510 defines a 3D representation of a mockup of the assembly including all of the data defined within the assembly node 502. The nodes of the assembly data structure 500 can be created similarly to the nodes of the part data structure 200 as discussed above with FIGS. 3A-3F. The 3D representation of the mockup of the assembly can be transmitted to the electronic end user device 110. In FIG. 5, the mockup node 510 is linked to a 3D representation of a digital mockup of the part as indicated by block 524.

Figure 6:
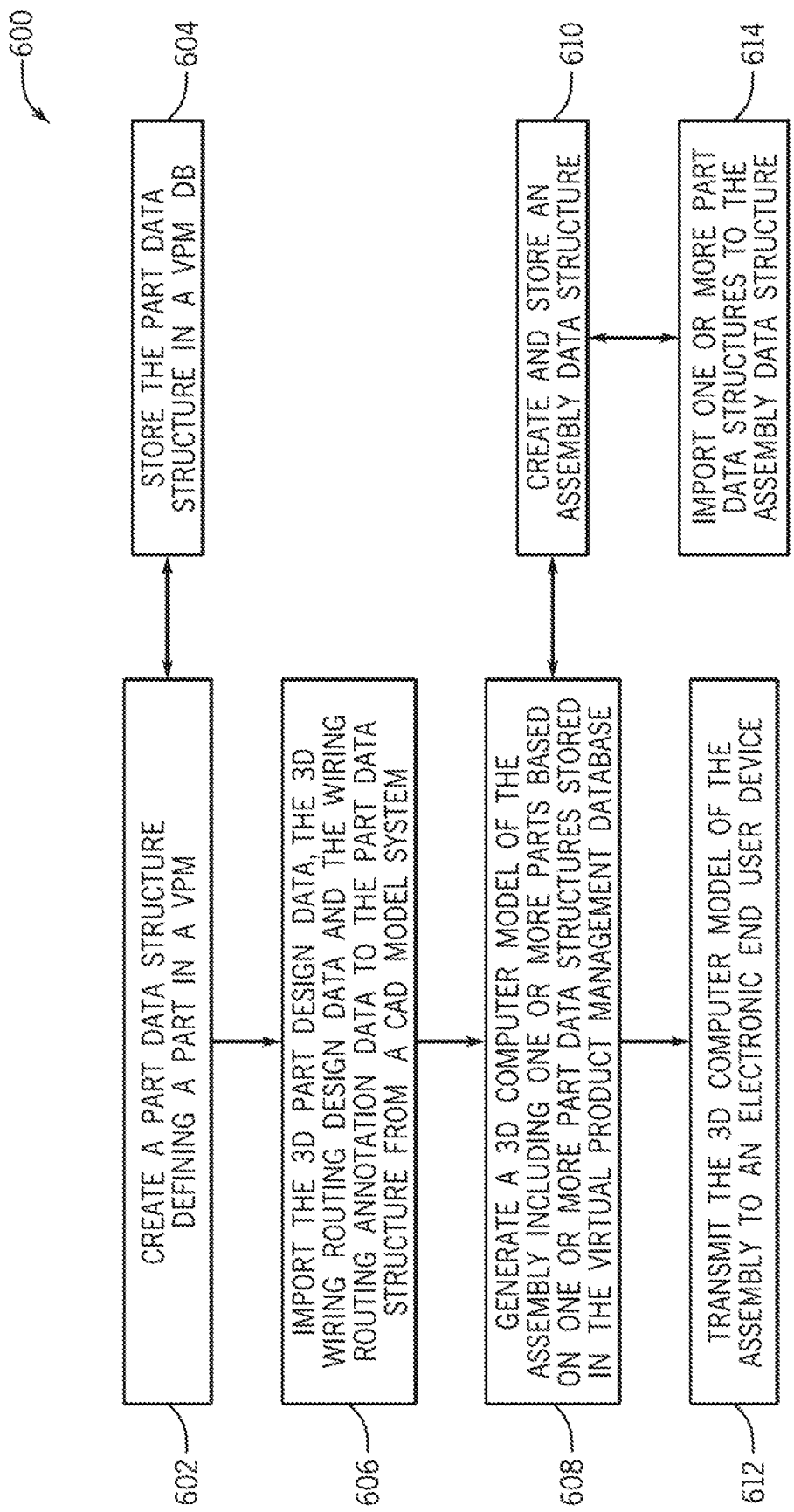
FIG. 6 is an exemplary data flow diagram for a method for generating a three-dimensional (3D) computer model of an assembly including wiring routing according to an exemplary embodiment.
Figure 7:
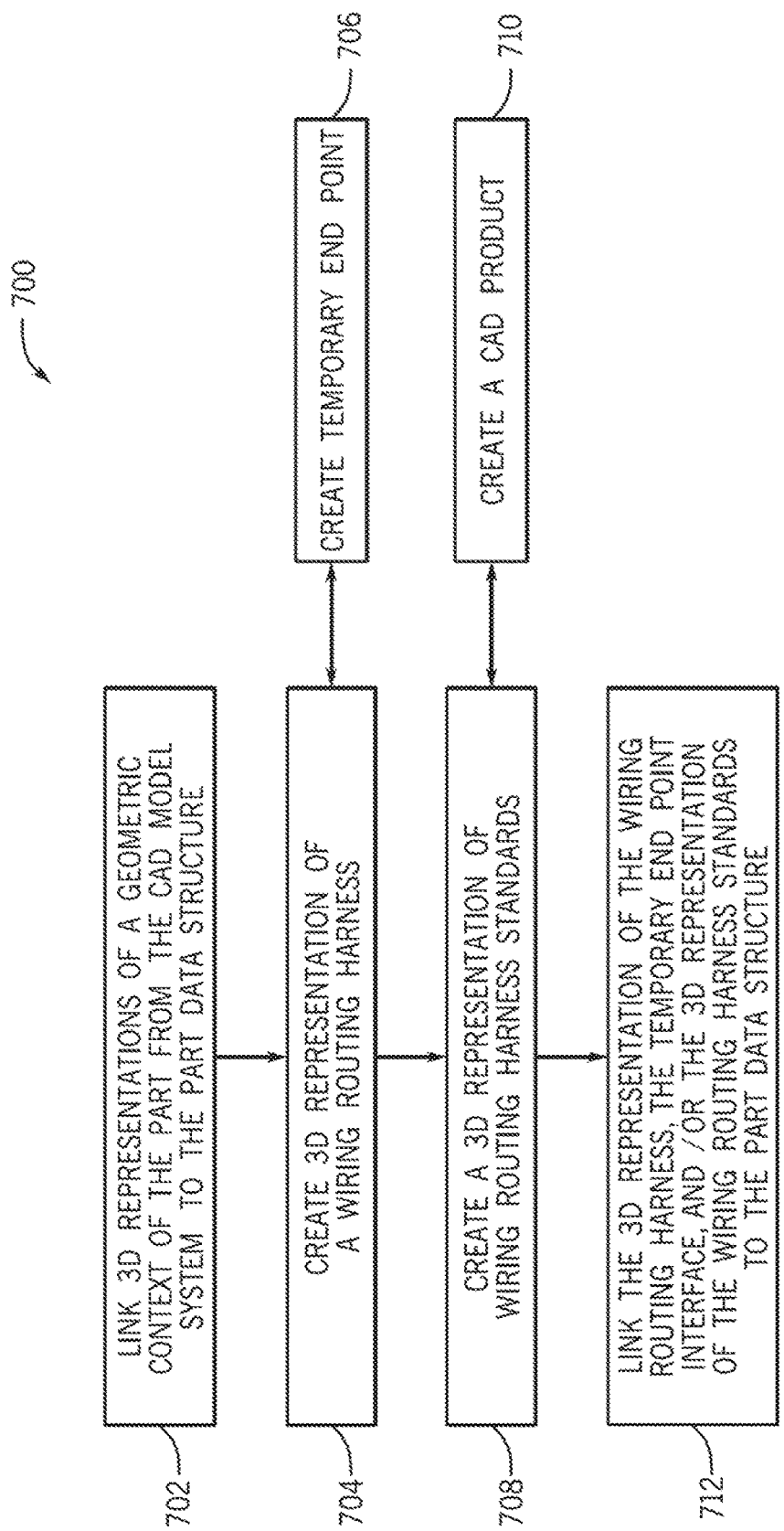
FIG. 7 is an exemplary data flow diagram for a method for importing 3D part design data, 3D wiring routing design data and the wiring routing annotation data according to an exemplary embodiment.
Figure 8:
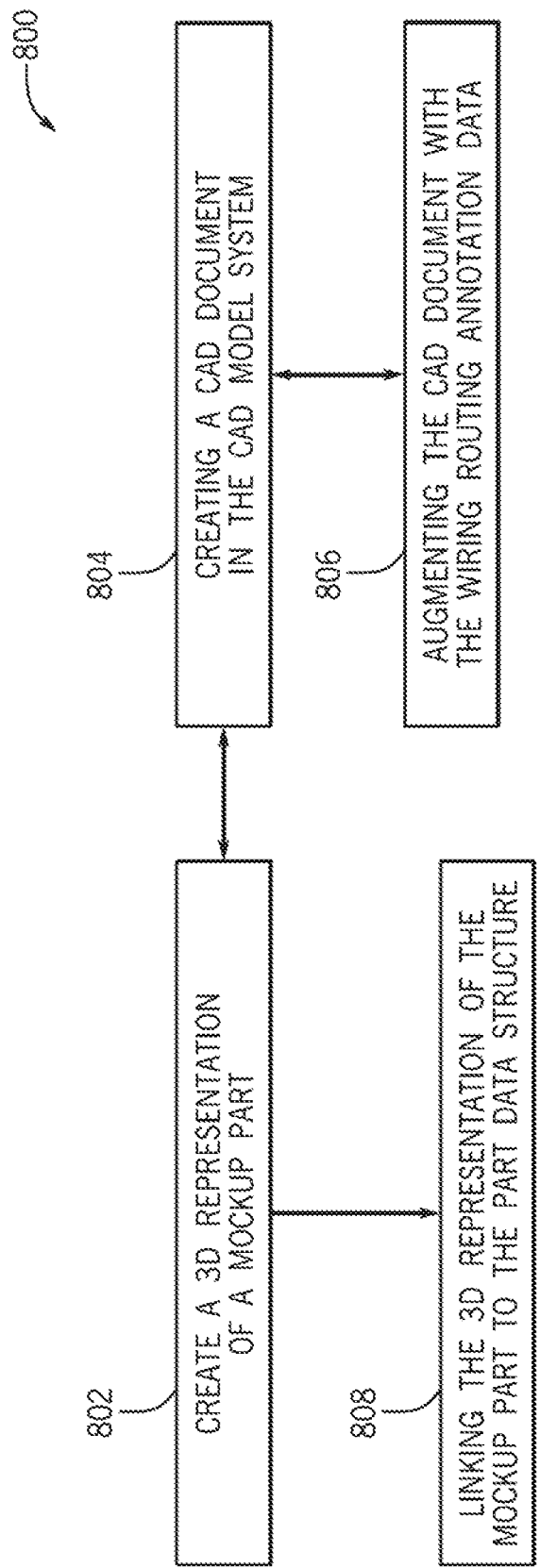
FIG. 8 is an exemplary data flow diagram for a method for creating a 3D representation of a mockup part according to an exemplary embodiment.

V. Methods for Product Data Management and 3D Model Visualization of Electrical Wiring Design and Specifications Referring now to FIGS. 6-8, exemplary methods for product data management and 3D model visualization of electrical wiring design and specifications will be described. FIGS. 6-8 will be described with references to the figures discussed above. It is understood that in some embodiments, the methods and processes discussed herein can be implemented stored as non-transitory computer-readable storage medium (i.e. non-transitory CRM 156) executed by the processor 112 and/or the processor 126.

FIG. 6 is an exemplary data flow diagram for a method 600 for generating a three-dimensional (3D) computer model of an assembly including wiring routing according to an exemplary embodiment. At block 602, the method 600 includes creating a part data structure defining a part in a virtual product management system. For example, the processor 112 can be configured to create the part data structure 200 in the VPM system 102. In another embodiment, block 602 can include instantiating a part data structure defining a part in a virtual product management system. The part data structure can include a plurality of nodes defining at least 3D part design data, 3D wiring routing design data and wiring routing annotation data of the part. For example, the part data structure 200 includes a plurality of nodes as shown in FIG. 2. Further, at block 604, the method 600 can include storing the part data structure in a virtual product management database. Thus, the processor 112 can store the part data structure 200 in the VPMDB 108.

At block 606, the method 600 includes importing at least the 3D part design data, the 3D wiring routing design data and the wiring routing annotation data to the part data structure from a computer-aided design (CAD) model system. As discussed above with FIGS. 3A-3F, 3D part design data, the 3D wiring routing design data and the wiring routing annotation data can be created and imported from the CAD model system 104 to the corresponding nodes of the part data structure 200 managed and/or stored by the VPM system 102.

Block 606 will now be described in more detail with reference to method 700 of FIG. 7 and method 800 of FIG. 8. In one embodiment, at block 702, importing the 3D part design data further includes linking 3D representations of a geometric context of the part from the CAD model system to the part data structure. As discussed above with FIG. 3A, the processor 112 is configured to import at least the 3D part design data from the CAD model system 104. The 3D part design data can include the CAD contextual part 328 and the CAD contextual part 330. By importing at least the 3D part design data a dynamic link is created between the nodes (e.g., containers) from the CAD part 326 to the respective nodes of the part node 310 of the VPM system 102.

Further, at block 704, the method 700 includes creating a 3D representation of a wiring routing harness on a surface of the part, wherein the surface of the part is part of the geometric context of the part, in the CAD model system. The 3D representation of the wiring routing harness on the surface of the part defines the design of wiring routing on the surface of the part. As discussed above with FIG. 3B, the CAD contextual part 358 defines sensor 368 and can be imported to the standard node 314 of the part node 310 of the VPM system 102.

In one embodiment, creating a 3D representation of a wiring routing harness on a surface of the part can also include creating a temporary end point of the wiring routing harness at block 706. For example, creating a temporary end point interface of the wiring routing harness of the part to a secondary primary part. Referring again to FIG. 3B, the temporary end point 376 be imported from the CAD model system 104 to the interface node 322 of the VPM part data structure.

At block 708, the method 700 includes creating a 3D representation of wiring routing harness standards in the CAD model system. Creating the 3D representation of wiring routing harness standards includes creating a CAD product in the CAD model system at block 710. Further, standards instantiated in the 3D representation of the wiring routing harness are linked to the CAD product. As discussed above with FIGS. 3E and 3D, a new CAD product 396 is created and linked to the CAD contextual parts 350. For example, the CAD contextual parts are copied to the new CAD product 396. The new CAD product 396 is linked to the CAD part 342.

At block 712, importing the 3D wiring routing design data further includes linking the 3D representation of wiring routing harness standards to the part data structure. Thus, the new CAD product 396 is opened in a new CAD window 398 and the new CAD product 396 is imported to the standard node 314 of the part data structure 200 (e.g., block 220).

Referring now to FIG. 8, the method 800 includes creating a 3D representation of a mockup part at block 802. In particular, creating the 3D representation of the mockup part includes creating a CAD document in the CAD model system at block 804. The 3D representation of the mockup part includes the 3D representation of the wiring routing harness on the surface of the part. Further, at block 806, the method 800 can include and augmenting the CAD document with the wiring routing annotation data. At block 808, the method 800 further includes linking the 3D representation of the mockup part to the part data structure. As discussed above with FIGS. 3C and 3D, to create and import the data needed for the mockup node, a new CAD document is created for the part. In FIG. 3C, the CAD specification window 304 includes a new CAD document 380 which shows an expanded view of the CAD part 342 for mockup. Here, all of the features of the routing harness, including the CAD sub product 346, the CAD contextual part 348 and the CAD contextual parts 350 are linked to the CAD document 380. In FIG. 3C, the specifications of the CAD part for mockup 344 are shown linked to their respective nodes of the CAD specification tree 341. Specifically, CAD parts 384 are linked to CAD sub product 346, CAD parts 386 are linked to CAD contextual part 348 and CAD parts 388 are linked to CAD contextual parts 350. Further, a user (not shown), can place and/or augment annotations 394 on the secondary primary part 336. A capture is created of the secondary primary part 336 including the annotations 394 and added to the new document 380. The new document 380 is then imported to the mockup node 318 of the part node 310 of the VPM system 102.

Referring again to method 600 of FIG. 6, at block 608 the method includes generating a 3D computer model of the assembly including one or more parts based on one or more part data structures stored in the virtual product management database. The 3D computer model of the assembly combining the 3D part design data, the 3D wiring routing design data and the wiring routing annotation data. In one embodiment, generating the 3D computer model of the assembly further includes creating and storing an assembly data structure defining the assembly in the virtual product management database and importing one or more part data structures stored in the virtual product management database to the assembly data structure.

Thus, at block 610, the method 600 can also include creating and storing an assembly data structure defining the assembly. More specifically, at block 614, the method 600 can include importing one or more part data structures to the assembly data structure.

At block 612, the method 600 includes transmitting the 3D computer model of the assembly to an electronic end user device. Thus, a user in possession of the electronic end user device can view a complete digital mockup of the assembly including physical and logical data (e.g., 2D data, annotations).

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for generating a three-dimensional (3D) computer model of an assembly including wiring routing, comprising:

creating a part data structure defining a part in a virtual product management system and storing the part data structure in a virtual product management database, the part data structure including a plurality of nodes defining at least 3D part design data, 3D wiring routing design data and wiring routing annotation data of the part;

importing at least the 3D part design data the 3D wiring routing design data and the wiring routing annotation data to the part data structure from a computer-aided design (CAD) model system, wherein a 3D representation of a wiring routing harness, a 3D representation of a mockup part, and a 3D representation of wiring routing harness standards are electronically linked to the part data structure, the CAD model system operably connected for computer communication to the virtual product management system and the virtual product management database, wherein importing the 3D part design data further includes linking 3D representations of a geometric context of the part from the CAD model system to the part data structure;

generating a 3D computer model of the assembly including one or more parts based on one or more part data structures stored in the virtual product management database, the 3D computer model of the assembly combining the 3D part design data, the 3D wiring routing design data and the wiring routing annotation data; and transmitting the 3D computer model of the assembly to an electronic end user device, wherein the electronic end user device is controlled to present a graphical user interface that includes the 3D computer model that includes 3D physical and logical data that incorporates a 3D representation of parts with specification data to provide real-time electronic virtual visualization of 3D views with two-dimensional data to facilitate production of systems that include multiple parts that are interconnected to form the assembly.

2. The computer-implemented method of claim 1, further including creating a 3D representation of the wiring routing harness on a surface of the part, wherein the surface of the part is part of the geometric context of the part, in the CAD model system, wherein the 3D representation of the wiring routing harness on the surface of the part defines the design of wiring routing on the surface of the part.

3. The computer-implemented method of claim 2, further including creating a temporary end point interface of the wiring routing harness of the part to a secondary primary part.

4. The computer-implemented method of claim 3, wherein importing the 3D wiring routing design data further includes linking the 3D representation of the wiring routing harness and the temporary end point interface to the part data structure.

5. The computer-implemented method of claim 2, further including creating the 3D representation of the mockup part, wherein creating the 3D representation of the mockup part includes creating a CAD document in the CAD model system, the 3D representation of the mockup part including the 3D representation of the wiring routing harness on the surface of the part, and augmenting the CAD document with the wiring routing annotation data.

6. The computer-implemented method of claim 5, further including linking the 3D representation of the mockup part to the part data structure.

7. The computer-implemented method of claim 2, further including creating a 3D representation of wiring routing harness standards in the CAD model system, wherein creating the 3D representation of wiring routing harness standards includes creating a CAD product in the CAD model system and linking standards instantiated in the 3D representation of the wiring routing harness to the CAD product.

8. The computer-implemented method of claim 7, wherein importing the 3D wiring routing design data further includes linking the 3D representation of wiring routing harness standards to the part data structure.

9. The computer-implemented method of claim 1, wherein generating the 3D computer model of the assembly further includes creating and storing an assembly data structure defining the assembly in the virtual product management database and importing one or more part data structures stored in the virtual product management database to the assembly data structure.

10. A system for generating a three-dimensional (3D) computer model of an assembly including wiring routing, comprising:

a virtual product management system operably connected for computer communication to a virtual product management database;

a computer-aided design (CAD) model system operably connected for computer communication to the virtual product management system and the virtual product management database;

an electronic end user device operably connected for computer communication to the virtual product management system; and a memory storing instructions that are executed by a processor operably connected for computer communication to the virtual product management system, the virtual product management database, the CAD model system, and the electronic end user device, the processor configured to execute the stored instructions that cause the processor to:

create a part data structure defining a part in the virtual product management system and store the part data structure in the virtual product management database, the part data structure including a plurality of nodes defining at least 3D part design data, 3D wiring routing design data and wiring routing annotation data of the part;

import at least the 3D part design data, the 3D wiring routing design data and the wiring routing annotation data to the part data structure from the CAD model system wherein importing the 3D part design data further includes linking 3D representations of a geometric context of the part from the CAD model system to the part data structure, wherein a 3D representation of a wiring routing harness, a 3D representation of a mockup part, and a 3D representation of wiring routing harness standards are electronically linked to the part data structure;

generate a 3D computer model of an assembly including one or more parts based on one or more part data structures stored in the virtual product management database, the 3D computer model of the assembly combining the 3D part design data, the 3D wiring routing design data and the wiring routing annotation data; and transmit the 3D computer model of the assembly to the electronic end user device for display, wherein the electronic end user device is controlled to present a graphical user interface that includes the 3D computer model that includes 3D physical and logical data that incorporates a 3D representation of parts with specification data to provide real-time electronic virtual visualization of 3D views with two-dimensional data to facilitate production of systems that include multiple parts that are interconnected to form the assembly.

11. The system of claim 10, wherein the processor is further configured to create a 3D representation of the wiring routing harness on a surface of the part based at least upon user input received by the CAD model system, wherein the 3D representation of the wiring routing harness on the part defines the design of wiring routing on the surface of the part.

12. The system of claim 11, wherein the processor is further configured to create the 3D representation of the mockup part in a CAD document of the CAD model system, the 3D representation of the mockup part including the 3D representation of the wiring routing harness on the surface of the part, and augmenting the CAD document with the wiring routing annotation data based on user input received by the CAD model system.

13. The system of claim 12, wherein the processor is further configured to create a 3D representation of wiring routing harness standards in the CAD model system, wherein creating the 3D representation of wiring routing harness standards includes generating a CAD product in the CAD model system and linking standards instantiated in the 3D representation of the wiring routing harness to the CAD product.

14. The system of claim 13, wherein the processor is configured to import at least the 3D part design data, the 3D wiring routing design data and the wiring routing annotation data to the part data structure from the CAD model system by linking the 3D representation of the wiring routing harness, the 3D representation of the mockup part, and the 3D representation of wiring routing harness standards to the part data structure.

15. A non-transitory computer-readable storage medium storing instructions that, when executed by a computer, which includes a processor, that causes the computer to perform a method, the method comprising:
instantiating a part data structure defining a part in a virtual product management system and storing the part data structure in a virtual product management database, the part data structure including a plurality of nodes defining at least 3D part design data, 3D wiring routing design data and wiring routing annotation data of the part;
importing at least the 3D part design data, the 3D wiring routing design data and the wiring routing annotation data to the part data structure from a computer-aided design (CAD) model system wherein importing the 3D part design data further includes linking 3D representations of a geometric context of the part from the CAD model system to the part data structure, wherein a 3D representation of a wiring routing harness, a 3D representation of a mockup part, and a 3D representation of wiring routing harness standards are electronically linked to the part data structure;
generating a 3D computer model of an assembly including one or more parts based on one or more part data structures stored in the virtual product management database, the 3D computer model of the assembly combining the 3D part design data, the 3D wiring routing design data and the wiring routing annotation data; and
transmitting the 3D computer model of the assembly to an electronic end user device, wherein the electronic end user device is controlled to present a graphical user interface that includes the 3D computer model that includes 3D physical and logical data that incorporates a 3D representation of parts with specification data to provide real-time electronic virtual visualization of 3D views with two-dimensional data to facilitate production of systems that include multiple parts that are interconnected to form the assembly.

16. The non-transitory computer-readable storage medium of claim 15, further including creating a 3D representation of the wiring routing harness on a surface of the part in the CAD model system, wherein the 3D representation of the wiring routing harness on the surface of the part defines the design of wiring routing on the surface of the part.

17. The non-transitory computer-readable storage medium of claim 16, further including creating the 3D representation of the mockup part, wherein creating the 3D representation of the mockup part includes creating a CAD document in the CAD model system including the 3D representation of the wiring routing harness on the surface of the part, and augmenting the CAD document with the wiring routing annotation data based on received user input.

18. The non-transitory computer-readable storage medium of claim 17, further including creating a 3D representation of wiring routing harness standards in the CAD model system, wherein creating the 3D representation of wiring routing harness standards includes creating a CAD product in the CAD model system and linking standards instantiated in the 3D representation of the wiring routing harness to the CAD product.

19. The non-transitory computer-readable storage medium of claim 17, wherein importing the 3D part design data, the 3D wiring routing design data and the wiring routing annotation data to the part data structure from the CAD model system further includes receiving the 3D representation of the wiring routing harness, the 3D representation of the mockup part and the 3D representation of wiring routing harness standards from the CAD model system and linking the 3D representation of the wiring routing harness, the 3D representation of the mockup part and the 3D representation of wiring routing harness standards to the part data structure.

* * * * *